(12) United States Patent
Cao et al.

(10) Patent No.: US 11,755,807 B2
(45) Date of Patent: Sep. 12, 2023

(54) METHOD FOR PREDICTING DELAY AT MULTIPLE CORNERS FOR DIGITAL INTEGRATED CIRCUIT

(71) Applicant: SOUTHEAST UNIVERSITY, Nanjing (CN)

(72) Inventors: Peng Cao, Nanjing (CN); Kai Wang, Nanjing (CN); Tai Yang, Nanjing (CN); Wei Bao, Nanjing (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 0 days.

(21) Appl. No.: 18/010,131

(22) PCT Filed: Mar. 9, 2022

(86) PCT No.: PCT/CN2022/079922
§ 371 (c)(1),
(2) Date: Dec. 13, 2022

(87) PCT Pub. No.: WO2022/247388
PCT Pub. Date: Dec. 1, 2022

(65) Prior Publication Data
US 2023/0195986 A1 Jun. 22, 2023

(30) Foreign Application Priority Data

May 26, 2021 (CN) .......................... 202110582508.7

(51) Int. Cl.
*G06F 30/367* (2020.01)
*G06N 3/0442* (2023.01)
(Continued)

(52) U.S. Cl.
CPC ........... *G06F 30/367* (2020.01); *G06N 3/045* (2023.01); *G06N 3/0442* (2023.01);
(Continued)

(58) Field of Classification Search
USPC ........................................................ 716/108
See application file for complete search history.

(56) References Cited

U.S. PATENT DOCUMENTS 5,677,867 A * 10/1997 Hazani .................. G11C 16/08
257/E27.103
7,290,232 B1 10/2007 Fung et al.
(Continued)

FOREIGN PATENT DOCUMENTS

| CN | 109255159 A | 1/2019 |
|----|-------------|--------|
| CN | 109255160 A | 1/2019 |

(Continued)

OTHER PUBLICATIONS

Wang, Zhen et al., "Time Series Prediction Model Based on Time Domain Convolution and Bidirectional GRU Neural Network," Software Guide, Mar. 15, 2020, pp. 48-52, vol. 19, Issue No. 3.
(Continued)

*Primary Examiner* — Mohammed Alam
(74) *Attorney, Agent, or Firm* — Muncy, Geissler, Olds & Lowe, P.C.

(57) ABSTRACT

Disclosed in the present invention is a method for predicting a delay at multiple corners for a digital integrated circuit, which is applicable to the problem of timing signoff at multiple corners. In the aspect of feature engineering, a path delay relationship at adjacent corners is extracted by using a dilated convolutional neural network (Dilated CNN), and learning is performed by using a bi-directional long short-term memory model (Bi-directional Long Short-Term Memory, BLSTM) to obtain topology information of a path. Finally, prediction results of a path delay at a plurality of corners are obtained by using an output of a multi-gate mixture-of-experts network model (Multi-gate Mixture-of-Experts, MMoE). Compared with a conventional machine learning method, the present invention can achieve predic-
(Continued)

tion with higher precision through more effective feature engineering processing in a case of low simulation overheads, and is of great significance for timing signoff at multiple corners of a digital integrated circuit.

7 Claims, 6 Drawing Sheets

(51) Int. Cl.
    *G06N 3/0464*     (2023.01)
    *G06N 3/045*     (2023.01)
    *G06F 119/06*     (2020.01)
    *G06F 119/12*     (2020.01)

(52) U.S. Cl.
    CPC ........ *G06N 3/0464* (2023.01); *G06F 2119/06* (2020.01); *G06F 2119/12* (2020.01)

(56) References Cited

U.S. PATENT DOCUMENTS

| | | | | |
|---|---|---|---|---|
| 2018/0278253 | A1* | 9/2018 | Lu | H03K 5/135 |
| 2021/0005230 | A1* | 1/2021 | Wang | G11C 7/106 |
| 2021/0225425 | A1* | 7/2021 | Do | G11C 11/40615 |
| 2021/0374314 | A1* | 12/2021 | Oh | G06F 30/3315 |

FOREIGN PATENT DOCUMENTS

| | | |
|---|---|---|
| CN | 111324990 A | 6/2020 |
| CN | 113326656 A | 8/2021 |

OTHER PUBLICATIONS

Chen, Qipeng et al., "Real-time monitoring method for wear state of tool based on deep bidirectional GRU model," Computer Integrated Manufacturing Systems, Jul. 15, 2020, pp. 1782-1793, vol. 26, Issue No. 7.

Wei, Bao et al., "A Learning-Based Timing Prediction Framework for Wide Supply Voltage Design," Session 7A: Machine-learning based Design Automation, GLSVLSI '20—Virtual Event, Sep. 7-9, 2020, pp. 309-314.

Peng, Cao et al., "Topology-aided Multi-Corner Timing Predictor for Wide Voltage Design," IEEE Design & Test, Oct. 4, 2020, pp. 1-6.

* cited by examiner

METHOD FOR PREDICTING DELAY AT MULTIPLE CORNERS FOR DIGITAL INTEGRATED CIRCUIT

TECHNICAL FIELD

The present invention relates to the technology of delay prediction in the problem of timing signoff at multiple corners for an integrated circuit, belonging to the field of EDA technology.

BACKGROUND

As integrated circuit technology keeps advancing and chip application scenarios keep increasing, designers usually need to consider a variety of possible complex operating scenarios for a chip, which imposes high requirements on the design and verification of integrated circuits. For this reason, in a design procedure of an integrated circuit, to ensure that a chip operates properly under various conditions, it is usually necessary to perform timing analysis and verification on the chip under multiple condition combinations of process (Process, P), voltage (Voltage, V), and temperature (Temperature, T). However, it takes an excessively long time to simulate the circuit with multiple condition combinations of process, voltage, and temperature to obtain delay values for a path in the circuit, which severely prolongs the design cycle of the chip. A conventional dynamic voltage and frequency scaling technique cannot meet the timing verification requirements at low voltages. In addition, a cell library provided by a foundry only includes cell libraries near a nominal voltage and lacks cell libraries at low voltages. As a result, the conditions for timing verification at wide voltages cannot be met.

In advanced technology, during the design of an integrated circuit, it is usually necessary to analyze variations and fluctuations of path delays under multiple combinations of process, voltage, and temperature for a number of reasons as follows. First, a variation relationship between a path delay and a combination of process, voltage, and temperature is not a simple linear relationship in advanced technology. The variation relationship between the two is complex and sensitive. Therefore, it cannot be simply assumed that a delay value of a path varies monotonically with the conditions of process, voltage, and temperature during timing analysis. Therefore, different combinations of process, voltage, and temperature need to be considered during the timing verification and analysis of the circuit. Second, from the perspective of a critical path, critical paths obtained through rated simulation and fluctuated simulation are not the same for a fixed combination of process, voltage, and temperature, indicating that the use of an "extreme" condition combination of process, voltage, and temperature to truly represent a delay value of a critical path inevitably causes errors. Third, with the presence of fluctuations and uncertainties before manufacturing as well as the continually proposed new timing concepts that further increase condition combinations of process, voltage, and temperature, the problem of multiple corners becomes increasing serious.

However, if you want to reduce the risk of chip failure, tens of thousands of condition combinations of process, voltage, and temperature need to be simulated to make a chip truly stably operate in an actual industrial environment. However, this brings a huge time cost and as a result extends the entire design cycle of the chip. However, if a circuit is simulated at some corners, there is a risk that the chip fails during operation. This often leads to more severe industrial failures. Therefore, instead of a perfect balance, a compromise is required between speed and accuracy in actual production for the problem of multiple corners. Therefore, it is particularly important to establish a timing processing framework that is applicable to the problem of multiple corners.

Machine learning is widely used in the field of delay prediction nowadays. However, for the problem of delay prediction under multiple corners, currently available machine learning methods have not been able to achieve good prediction. There are two reasons for this. First, a data input in a matrix format is commonly used in conventional machine learning methods, and it is impossible to model sequence structure data, resulting the problem of high difficulty in extracting topology information of a path. The path in the circuit is one type of sequence feature, and the path structure of the path has an important influence on the corresponding path delay. Most of the related existing studies have mainly used consecutive-value features for modeling, and have not been able to improve the accuracy of delay prediction of a path by modeling sequence information and therefore using the topology information of the path. Therefore, how to learn a relationship between a delay and a topological feature of a path directly by using the model is an important issue in the field of delay prediction. Finally, conventional machine learning methods fail to pay enough attention to delay relationships under adjacent combinations of process, voltage, and temperature, and inevitably suffer from information loss. The problem of delay prediction is a regression problem in which most of the model input features are known delay features under adjacent combinations of process, voltage, and temperature. In the problem of cross-voltage domain delay prediction, a feature voltage domain delay is usually delays of a plurality of temperature points at some voltages. The delay values at different temperatures and voltages may form a piece of mesh delay data with delay values adjacent to adjacent combinations of process, voltage, and temperature. However, conventional machine learning models cannot handle such mesh data directly. Common machine learning models such as linear regression and random forest need to expand mesh data into one-dimensional vectors for modeling, which undoubtedly leads to information loss and limited accuracy of a model. Therefore, how to model mesh delay data to capture delay relationships of adjacent combinations of process, voltage, and temperature is another pressing problem for delay prediction.

SUMMARY

Technical problem: An objective of the present invention is to provide a method for predicting a delay at multiple corners for a digital integrated circuit, so that a path delay of a circuit can be predicted more accurately, and overheads caused by simulation can be reduced.

Technical solution: A method for predicting a delay at multiple corners for a digital integrated circuit of the present invention is provided, where the multiple corners are combinations of operating conditions including process, voltage, and temperature used to perform timing analysis and verification on a circuit, and the method includes the following steps:

S1: acquiring a timing report of a specified circuit by using a timing analysis tool, extracting topology information including a cell type, a cell size, and a corresponding load capacitance sequence of a path from the timing report, converting the path into a transistor-level netlist, changing parameters including process, voltage, and temperature in the netlist, and performing simulation by using a transistor-level simulation tool to obtain delay information of the path at corresponding corners;

S2: using the delay information of the path at the corners obtained by performing simulation by using the transistor-level simulation tool (HSPICE) in step S1 as an input of a dilated convolutional neural network (Dilated CNN) model, where after training, the neural network can associate delays at adjacent combinations of temperature and voltage with each other and learn a relationship between the delays, to obtain a more effective expression of a delay feature of the path;

S3: using the topology information of the path including the cell type, the cell size, and the corresponding load capacitance sequence extracted in step S1 as an input of a bi-directional long short-term memory neural network (BL-STM), where after training, the neural network can model the topology information of the path, to establish a correlation between a topological structure and a path delay of the path; and S4: combining an output of the dilated convolutional neural network (Dilated CNN) model in step S2 and an output of the bi-directional long short-term memory neural network (BLSTM) in step S3 as an input of a multi-gate mixture-of-experts network (MMoE), where after training, the model can establish relationships between delay information and topology information of the path at a high voltage and path delays of a plurality of temperature points at a low voltage, to implement simultaneous prediction of the path delays of the plurality of temperature points at the low voltage.

where
step S1 specifically includes the following steps:
S11: performing timing analysis on the circuit by using the timing analysis tool to obtain the timing report, where the timing report includes information of some paths in the circuit, and the information includes a delay of each path and a cell type, a cell size, and a corresponding load capacitance of a cell at each level in the path; and subsequently extracting a structure of the path, and extracting topology information in each path, where the topology information includes the cell type, the cell size, and the corresponding load capacitance sequence; and S22: converting the path into the transistor-level netlist by using the timing analysis tool, finally performing simulation by using the transistor-level simulation tool to obtain the delay information of the path, changing the parameters including process, voltage, and temperature in the netlist, performing simulation by using the transistor-level simulation tool (HSPICE) to obtain the delay information of the path at the corresponding corners, and extracting a path delay result for use in model training and inference in subsequent steps.

Figure 2:
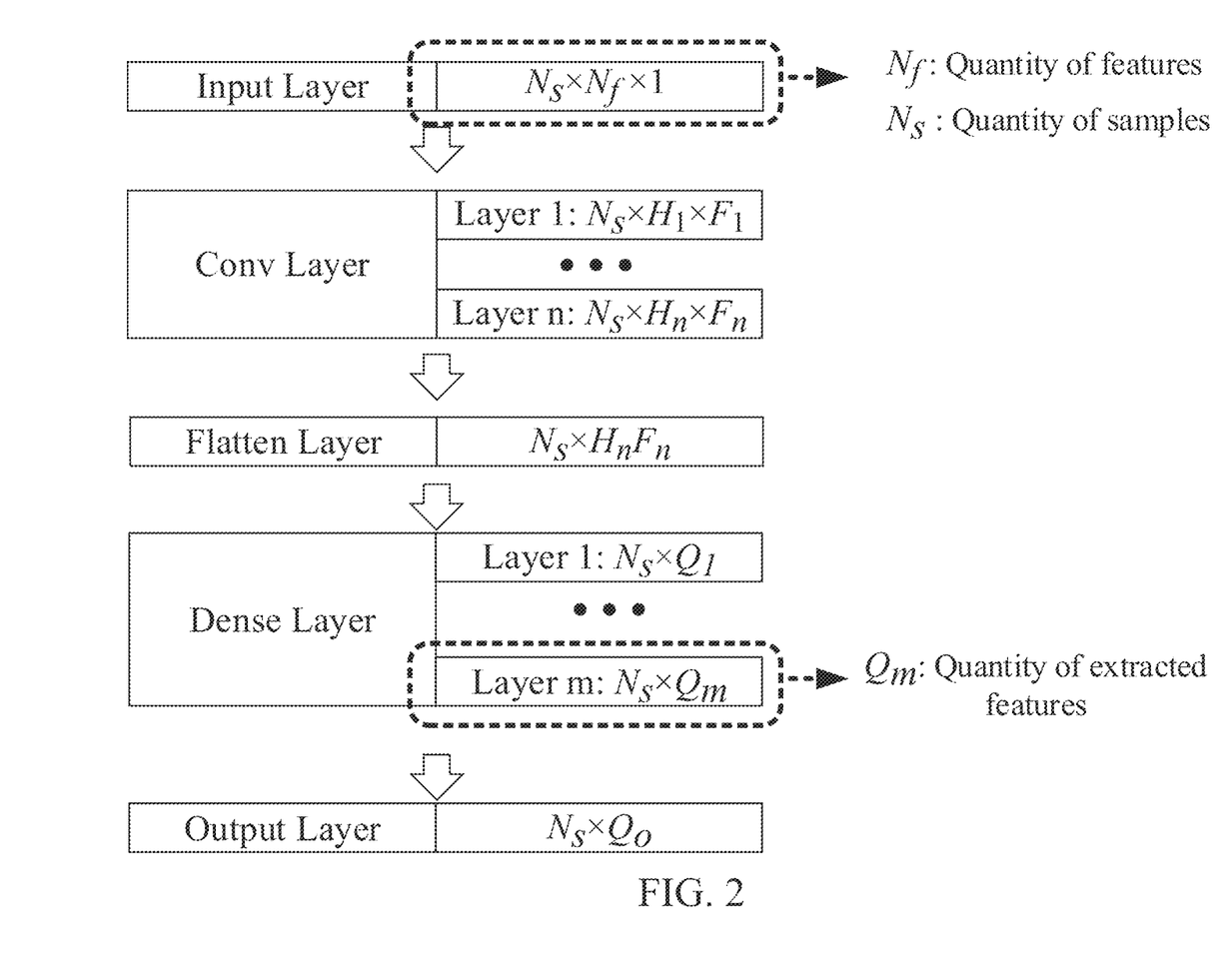
FIG. 2 is a schematic structural diagram of a dilated convolutional neural network (Dilated CNN) model.

In step S2, it is assumed that a voltage of delay data of the input is $V_i$, a quantity of samples is $N_s$, and a quantity of classes of temperature in circuit simulation is $N_f$, a sample dimension of the input may be represented as $(N_s, N_f)$; next, a dimension of an input layer (Input Layer) is changed to $(N_s, N_f, 1)$ to satisfy an input format requirement of a convolutional neural network, and 1 in the dimension of the input layer represents that the same process is used in current input circuits; subsequently, the input layer with the dimension converted is connected to N serially connected convolutional layers (Conv Layer), where $N>=2$; and for an $n^{th}$ convolutional layer, $F_n$ denotes a quantity of filters in the $n^{th}$ convolutional layer, that is, the last dimension outputted by the $n^{th}$ convolutional layer, $K_n$ and $S_n$ respectively denote a size and a stride of a convolution kernel in the $n^{th}$ convolutional layer, $D_n$ is a dilation coefficient of the $n^{th}$ convolutional layer, and a calculation formula of $H_n$ in the dimension outputted by the $n^{th}$ convolutional layer is as follows:

$$\begin{cases} H_1 = N_f - D_1 \\ H_n = H_{n-1} - D_n \quad n \geq 2 \end{cases} \tag{1}$$

subsequently, an output of a convolutional layer is connected to a flatten layer (Flatten Layer) and is used as an input, and the second dimension and the third dimension of a tensor outputted by the convolutional layer are flattened and combined to implement dimension reduction of data; after dimension conversion through a plurality of fully connected layers (Dense Layer), the data is inputted into an output layer (Output Layer), where a quantity of neurons in an $m^{th}$ fully connected layer (Dense Layer) is $Q_m$; and finally, an output feature of the output layer is a final feature extracted by a dilated convolutional neural network, a quantity of features is defined as $Q_o$, a final delay feature obtained through extraction is combined with an output feature in step S3 for use as the input of the multi-gate mixture-of-experts network (MMoE) in step S4.

Figure 3:
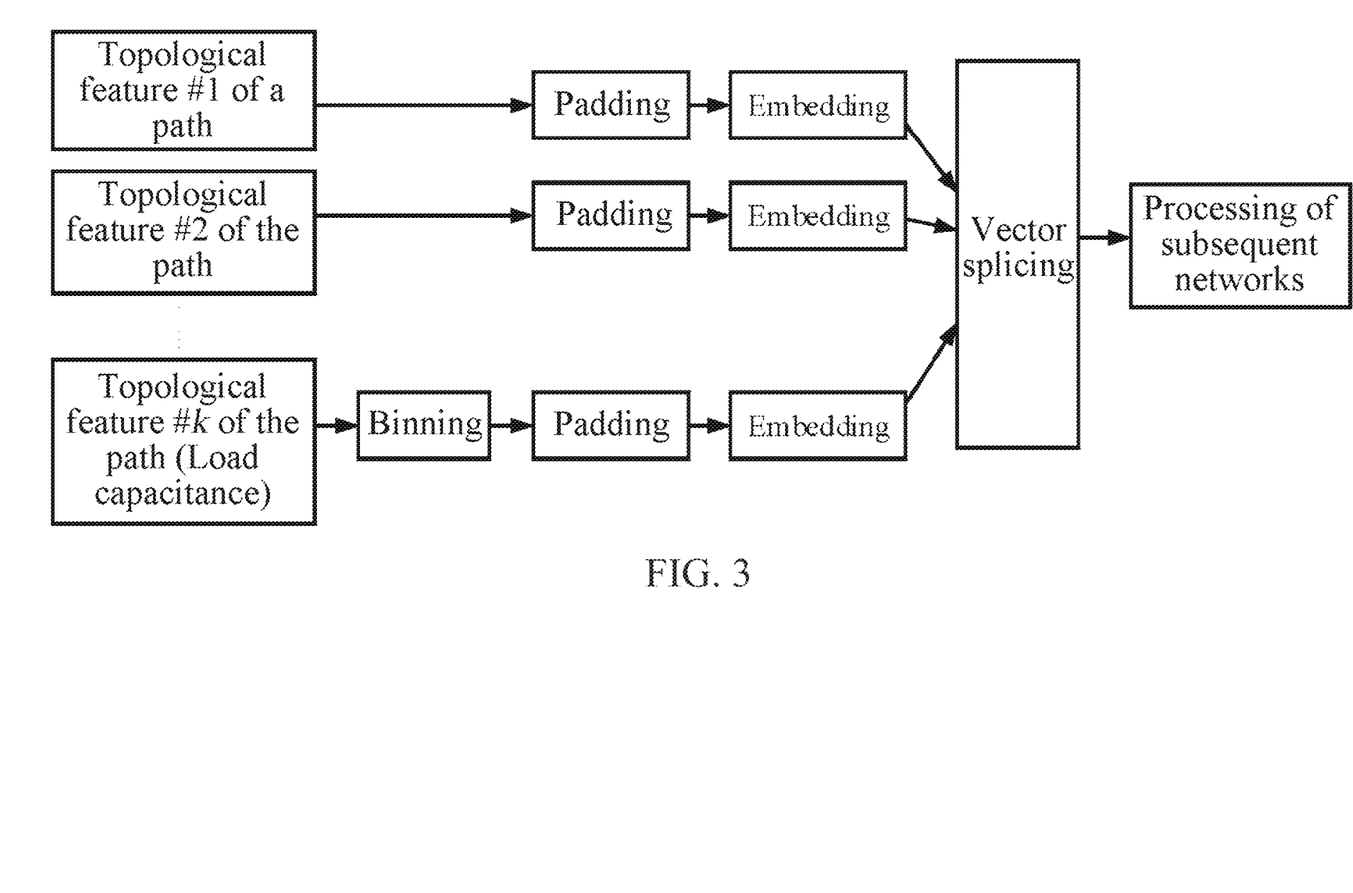
FIG. 3 is a schematic diagram of a process of preprocessing a sequence feature.
Figure 4:
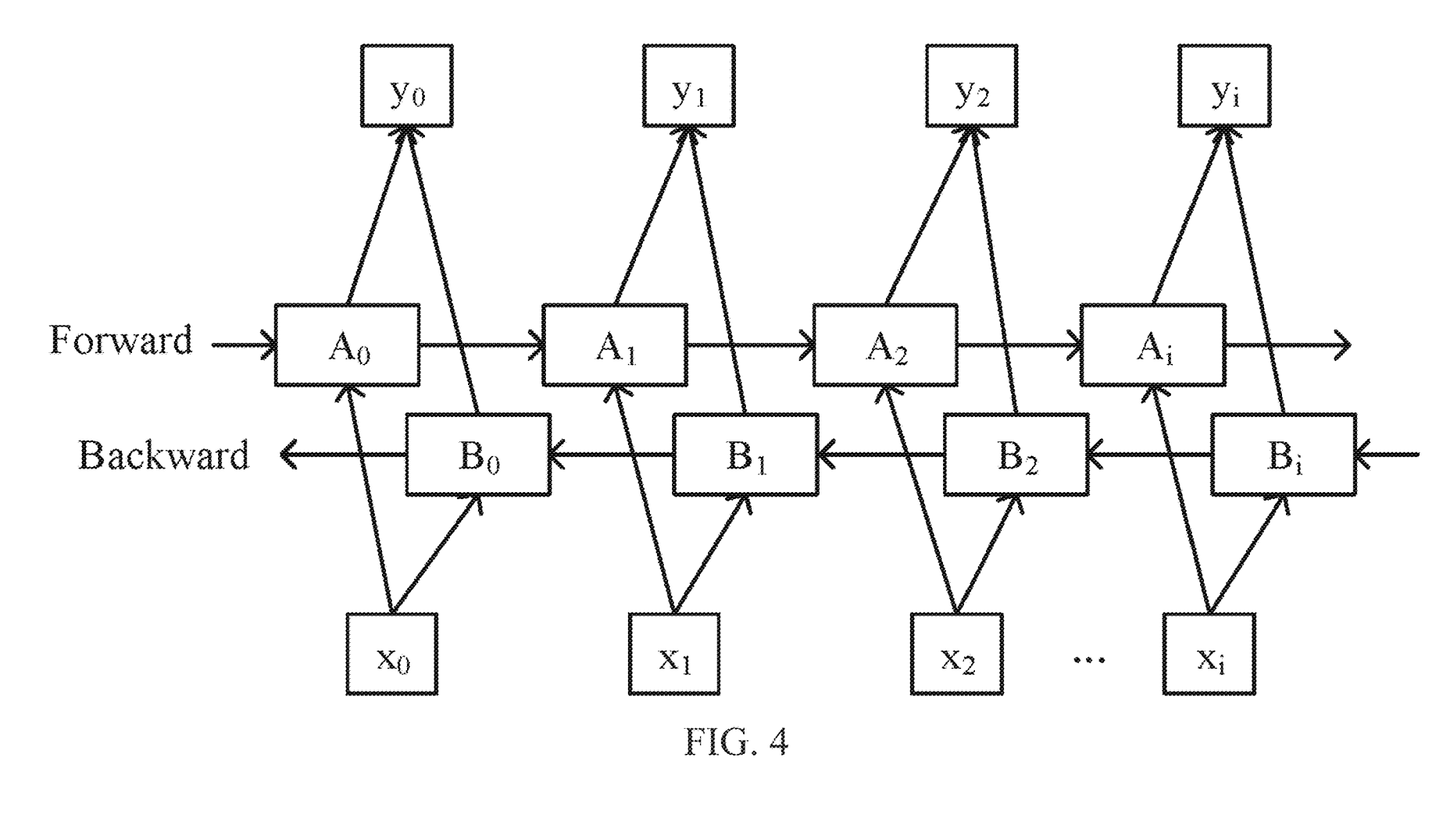
FIG. 4 is a schematic structural diagram of a bi-directional long short-term memory neural network (BLSTM) model.

In step S3, the topology information of the path includes the cell type, the cell size, and the corresponding load capacitance sequence, for two category-type sequence features of the cell type and the cell size, the problem of inconsistent sequence lengths of the two sequence features is first resolved through padding, then padded sequences are inputted into an embedding layer, a vector representation of an element is obtained through network learning, load capacitances are binned and filled by using a padding operation to a uniform length, and vector expressions are learned by using the embedding layer, next, vector splicing is performed on the foregoing expressions obtained after the learning using the embedding layer, and finally spliced vectors are inputted into the bi-directional long short-term memory neural network (BLSTM) to perform training.

Figure 5:
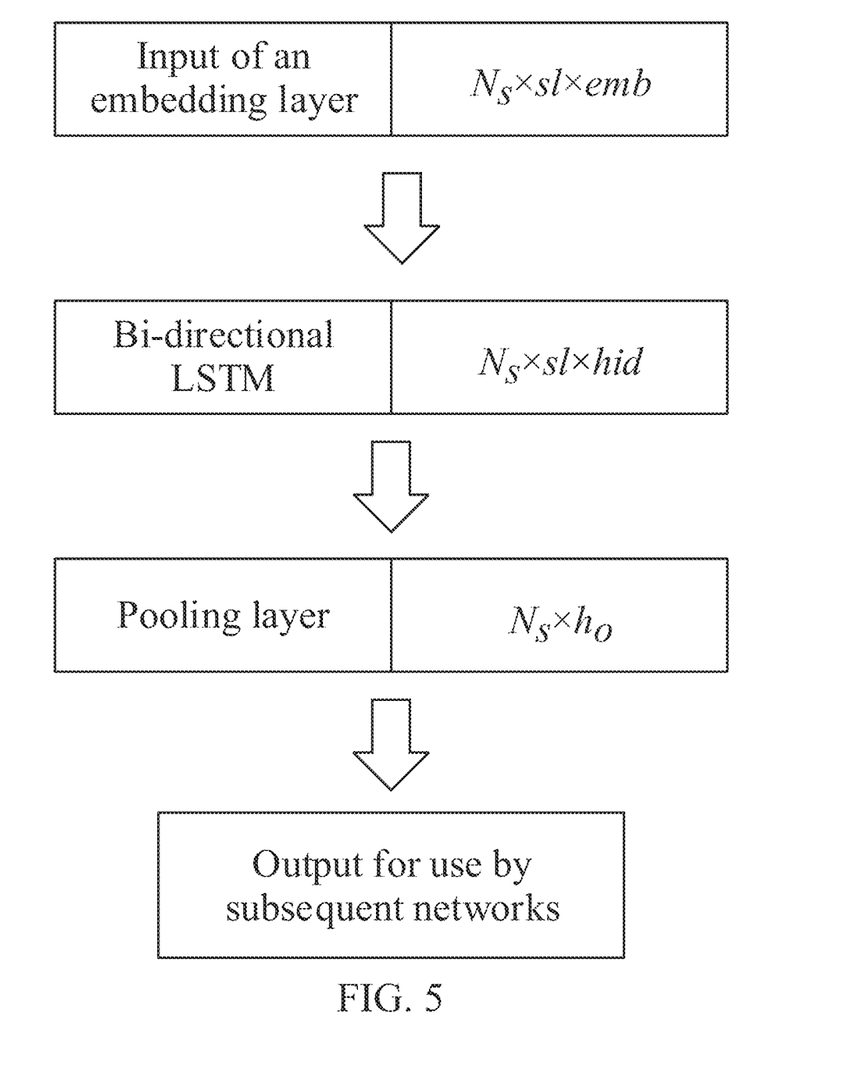
FIG. 5 is a schematic diagram of feature extraction of a bi-directional long short-term memory neural network (BLSTM)

For the two category-type sequences of the cell type and the cell size, a similar preprocessing measure is used for a sequence formed by variables of the two categories; a mapping from a character string into an integer number is performed on the sequence first, subsequently, an integer value vector of the path is padded to a uniform length, and a padding value is 0; and for a consecutive numerical value sequence formed by load capacitances, consecutive numerical values are first binned into different identifiers by using a binning method, and then each bin is mapped into an integral number, where a binning formula bin is as follows:

$$\text{bin}(x) = \text{round}(u*x)\%v + 1 \tag{2},$$

where the function round denotes a rounding function, x is an element in the load capacitance sequence, u denotes an amplification factor of the element, that is, a quantity of digits kept after the decimal point, a numerical value is an integer multiple of 10, and v is a quantity of bins; and a strategy of the binning maps the load capacitances into 1 to v, and after the mapping, a relative size relationship of data is still kept between the load capacitances; and subsequently, a topological feature of the path is extracted by using the bi-directional long short-term memory neural network (BLSTM), and data is first processed into an input form required for a network, and is then inputted into the network to perform training: first, after the inputted data is processed by the embedding layer, a dimension of the data is $N_s \times sl \times emb$, where $N_s$ is a quantity of samples, that is, a quantity of input paths; sl is an input length of a padded sequence, and is uniformly padded to the same length, that is, a quantity of levels of the longest input path, and emb denotes a quantity of neurons in the embedding layer, that is, a vector dimension when the element in the sequence is represented as a vector; subsequently, an output of the embedding layer is used as the input of the bi-directional long short-term memory neural network (BLSTM), because the bi-directional long short-term memory neural network (BLSTM) performs bi-directional learning on the sequence, the value of hid is equal to twice a quantity of neurons in a hidden layer; finally, a pooling layer is connected after the bi-directional long short-term memory neural network (BLSTM), dimension reduction is performed on the second dimension outputted by the sequence, a dimension of an outputted vector is $N_s \times h_o$; and a vector output after the dimension reduction by the pooling layer is combined with an output in step S2 for use as the input of the multi-gate mixture-of-experts network (MMoE) in S4.

Figure 6:
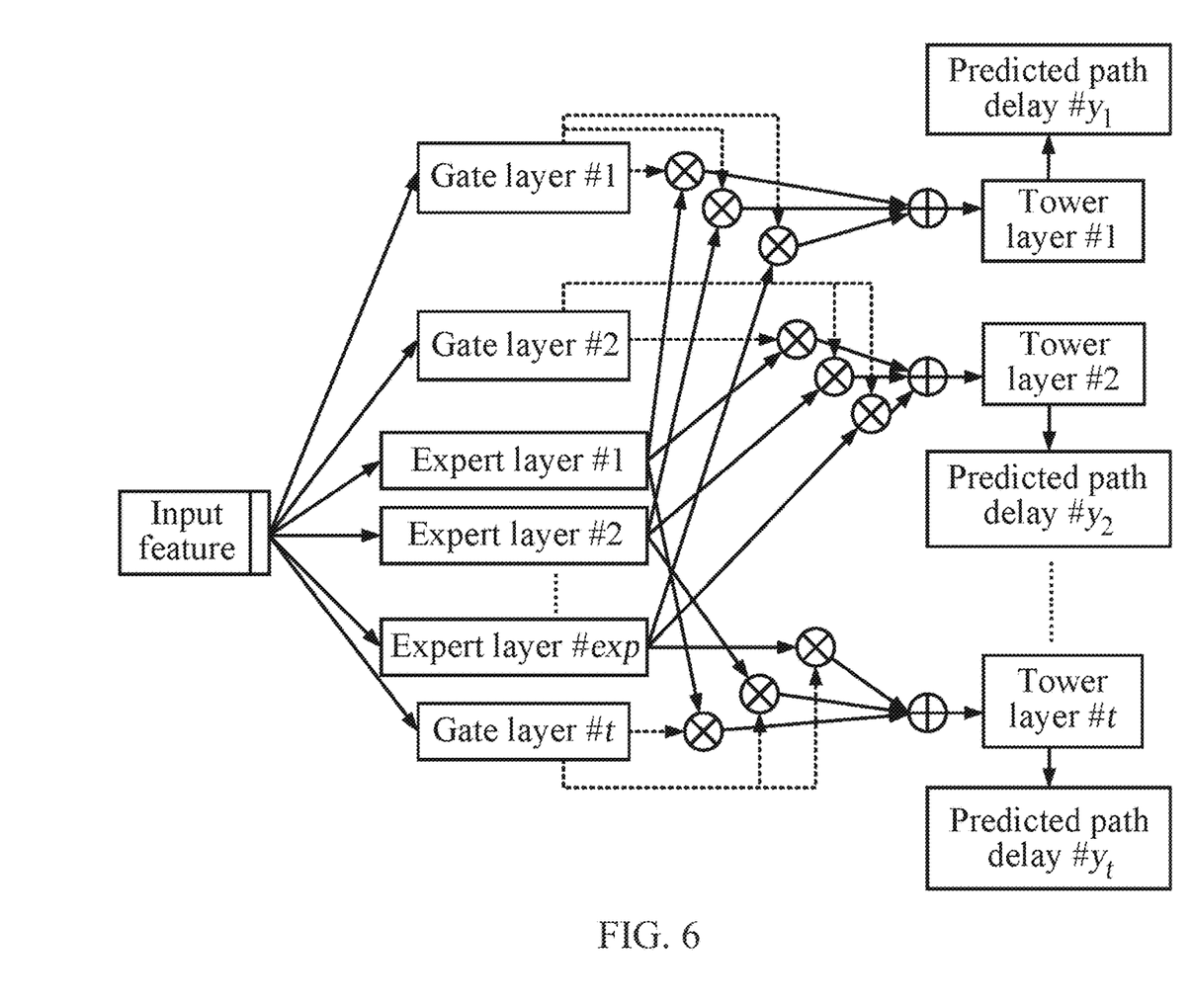
FIG. 6 is a schematic structural diagram of a multi-gate mixture-of-experts network (MMoE) model.

For the multi-gate mixture-of-experts network (MMoE) in step S4, an expert layer can perform learning on different tasks respectively, and after network learning, a gate function can assign different weights to different experts; and it is assumed that a quantity of tasks is K, and an output $y_k$ of a $k^{th}$ subtask is determined by the following Formula (3), where x is the input of the multi-gate mixture-of-experts network (MMoE), $h^k$ is a top tower function, $f^k$ is a shared bottom operation function, $g^k$ represents the gate function, $W_{gk}$ is a learnable parameter of a weight matrix in the model, and a dimension of the weight matrix is (n, d), where n and d are respectively a quantity of expert networks and a dimension of input features, that is, a quantity of features, and the function softmax is a normalization exponential function:

$$\begin{cases} y_k = h^k(f^k(x)) & k = 1, 2, \ldots, K \\ f^k(x) = \sum_{i=1}^{n} g^k(x)_i f_i(x) \\ g^k(x) = \text{softmax}(W_{gk} x) \end{cases} \quad (3)$$

The multi-gate mixture-of-experts network (MMoE), in a network structure of the model, the input features are a topological feature of the path extracted by the bi-directional long short-term memory neural network (BLSTM) and the delay feature of the path at adjacent combinations of process, voltage, and temperature, first, exp expert layers perform learning on the input features respectively, model parameters of these expert layers are not shared with each other, where a quantity of neurons in an expert layer and a quantity of neurons in a tower layer are denoted as $h_e$ and $h_t$ respectively; subsequently, t gate functions adjust a weight of each expert according to a loss function of actual labels and predicted values at t temperatures, and a final output is obtained by performing weighted summation on outputs of all the expert layers, that is, is delay prediction value results of the path at t temperature points at a voltage.

Beneficial effects: Disclosed in the present invention is a method for predicting a delay at multiple corners for a digital integrated circuit, which is applicable to the problem of timing signoff at multiple corners. In the aspect of feature engineering, a path delay relationship at adjacent corner is extracted by using a dilated convolutional neural network (Dilated CNN), and learning is performed by using a bi-directional long short-term memory model (Bi-directional Long Short-Term Memory, BLSTM) to obtain topology information of a path. Finally, prediction results of a path delay at a plurality of corners are obtained by using a multi-gate mixture-of-experts network model (Multi-gate Mixture-of-Experts, MMoE). Compared with a conventional machine learning method, the present invention can achieve prediction with higher precision through more effective feature engineering processing in a case of low simulation overheads, and is of great significance for timing signoff at multiple corners of a digital integrated circuit.

DETAILED DESCRIPTION

The technical solutions of the present invention are further described below with reference to specific implementations.

Figure 1:
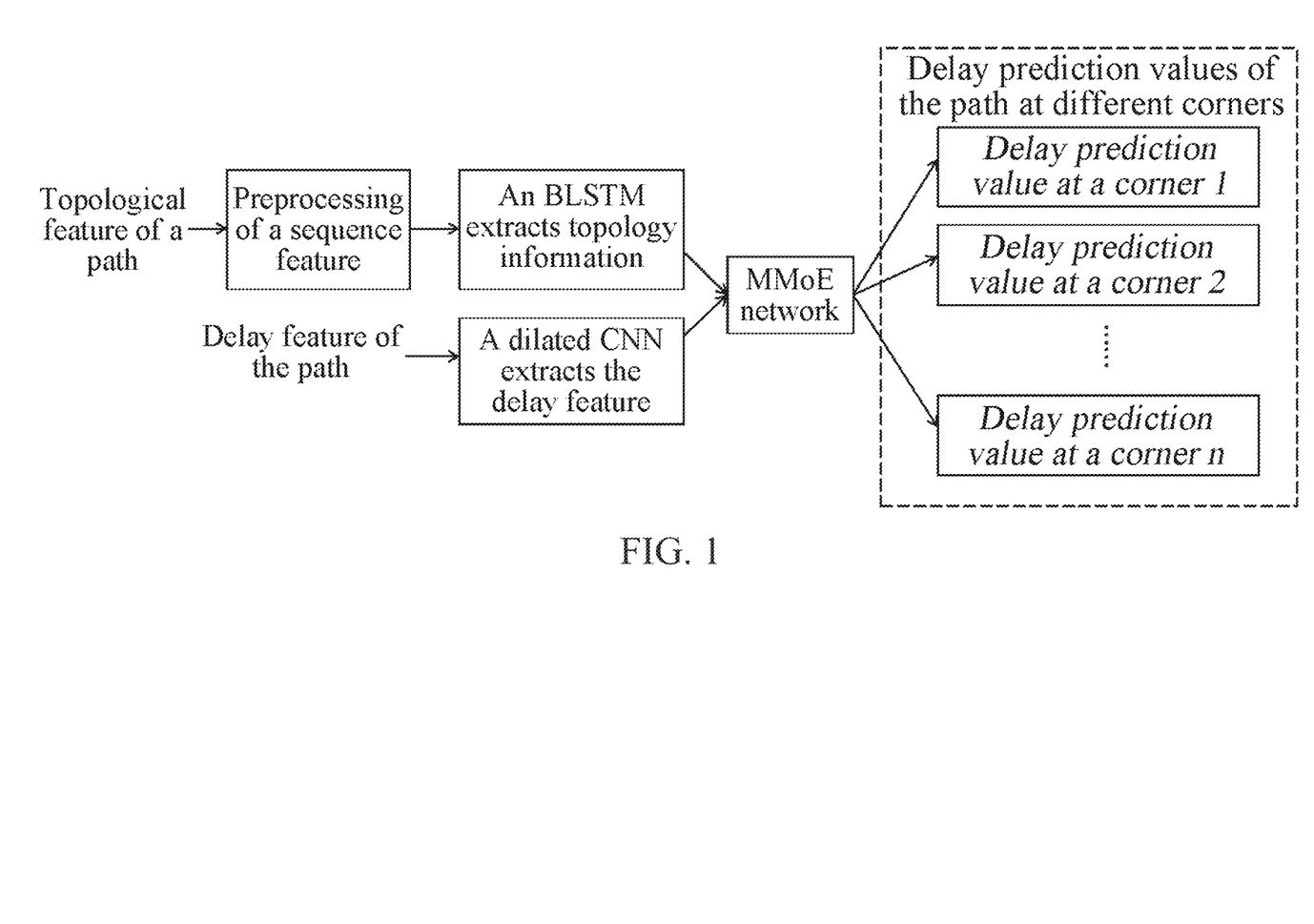
FIG. 1 is a schematic diagram of an architecture for predicting a delay at multiple corners for a digital integrated circuit according to the present invention.

Disclosed in specific implementation solutions of the present invention is method for predicting a delay at multiple corners for a digital integrated circuit. The multiple corners are combinations of operating conditions such as process, voltage, and temperature used to perform timing analysis and verification on a circuit. For example, voltage points in circuit simulation use 0.5 V, 0.6 V, 0.7 V, 0.8 V, 0.9 V, 1.0 V, and 1.1 V. Selected temperature points in simulation are −25° C., 0° C., 25° C., 75° C., 125° C. A process is TT. A total of 35 corners are formed. The method includes the following steps:

S1: Acquire a timing report of a specified circuit by using a timing analysis tool, extract topology information including a cell type, a cell size, and a corresponding load capacitance sequence of a path from the timing report, convert the path into a transistor-level netlist, change parameters including process, voltage, and temperature in the netlist, and perform simulation by using a transistor-level simulation tool (HSPICE) to obtain delay information of the path at corresponding corners. For example, first, 35 cell libraries at a total of 7 voltage points 0.5 V, 0.6 V, 0.7 V, 0.8 V, 0.9 V, 1.0 V, and 1.1 V and a total of 5 temperature points −25° C., 0° C., 25° C., 75° C., and 125° C. when a process is TT are obtained by using a library extraction tool (SiliconSmart). Topology information of a path of a specified circuit at the foregoing 35 corners obtained through simulation by using the timing analysis tool, and includes a cell type, a cell size, and a corresponding load capacitance sequence. The path is then converted into a transistor-level netlist, change parameters including process, voltage, and temperature in the netlist, and perform simulation by using a transistor-level simulation tool (HSPICE) to obtain delay information of the path at the foregoing 35 corners.

S2: Use the delay information of the path of the circuit at the corners obtained by performing simulation by using the transistor-level simulation tool (HSPICE) in step S1 as an input of a dilated convolutional neural network (Dilated CNN) model, where after training, the neural network can associate delays at adjacent combinations of temperature and voltage with each other and learn a relationship between these delays, to obtain a more effective expression of a delay feature of the path. For example, delay values of paths of a circuit requiring prediction at a total of 15 corner combinations of 3 voltage points 0.9 V, 1.0 V, and 1.1 V and 5 temperature points −25° C., 0° C., 25° C., 75° C., and 125° C. under a TT process form an input matrix of a dilated convolutional neural network (Dilated CNN) model. A dimension of the input matrix is (10000, 15, 1). 10000 is a total quantity of paths of the circuit requiring prediction. 15 is a quantity of combinations of voltage and temperature. 1 is a selected process, that is, a TT process. An output matrix of the model includes a delay relationship between adjacent corner combinations. A dimension of the output matrix is (10000, 128). 10000 is a total quantity of paths of the circuit requiring prediction. 128 is a quantity of neurons of an output layer of the dilated convolutional neural network (Dilated CNN) model, that is, a final quantity of features extracted by a dilated convolutional neural network.

S3: Use the topology information of the path including the cell type, the cell size, and the corresponding load capacitance sequence extracted in step S1 as an input of a bi-directional long short-term memory neural network (BLSTM), where after training, the neural network can model the topology information of the path, to establish a correlation between a topological structure and a path delay of the path. For example, a one-to-one mapping from a character into an integer number is first performed on a cell type sequence and a cell size sequence of a path of the circuit requiring prediction. Subsequently, the sequences are padded. A length after padding is the largest path length of the circuit requiring prediction. The padding value is 0. Capacitance sequences of paths are binned, and then a capacitance value in each bin is mapped into an integer number. Similarly, capacitance sequences of paths are padded to a uniform length, that is, a quantity of levels of the longest path of the circuit. A final obtained input matrix is (10000, 3, 40). 10000 is a quantity of paths of the circuit requiring prediction. 3 is a quantity of sequence categories, including a total of 3 types: a cell type, a cell size, and a corresponding load capacitance sequence. 40 is a quantity of levels of the longest path in the circuit requiring prediction, that is, the length of the sequence after padding. An output matrix of the model includes topology information of the path. A dimension of the output matrix is (10000, 128). 10000 is a total quantity of paths of the circuit requiring prediction. 128 is a quantity of neurons of an output layer of the BLSTM model, that is, a quantity of topological features of a path extracted by a BLSTM.

S4: Combine an output of the dilated convolutional neural network (Dilated CNN) model in step S2 and an output of the bi-directional long short-term memory neural network (BLSTM) in step S3 as an input of a multi-gate mixture-of-experts network (MMoE), where after training, the model can establish relationships between delay information and topology information of the path at a high voltage and path delays of a plurality of temperature points at a low voltage, to implement simultaneous prediction of the path delays of the plurality of temperature points at the low voltage. For example, the output of the dilated convolutional neural network (Dilated CNN) model in step S2 and the output of the bi-directional long short-term memory neural network (BLSTM) in step S3 are combined as the input of the multi-gate mixture-of-experts network (MMoE). A dimension of an input matrix is (10000, 256). A quantity of gate functions and a quantity of tower layers are both 5. A quantity of expert layers is set to 8. A dimension of an output matrix is (10000, 5). In this way, delay prediction values of 10000 paths at a voltage of 0.5 V and 5 temperature points may be simultaneously obtained.

Step S1 specifically includes the following steps:

S11: First, obtain 35 cell libraries at a total of 7 voltage points 0.5 V, 0.6 V, 0.7 V, 0.8 V, 0.9 V, 1.0 V, and 1.1 V and a total of 5 temperature points −25° C., 0° C., 25° C., 75° C., and 125° C. when a process is TT by using a library extraction tool (SiliconSmart). A running mode of a timing simulation tool is set to setup time timing violation to perform timing analysis on a circuit to obtain a corresponding timing report. The timing report includes information of some paths in the circuit, and the information includes a delay of each path and a cell type, a cell size, a corresponding load capacitance, and the like of a cell at each level in the path. Subsequently, the structure of the path is extracted, and topology information in each path is extracted. The topology information includes the cell type, the cell size, and the corresponding load capacitance sequence.

S22: Convert the path into the transistor-level netlist by using the timing analysis tool, finally perform simulation by using the transistor-level simulation tool to obtain the delay information of the path, change the parameters including process, voltage, and temperature in the netlist, perform simulation by using the transistor-level simulation tool (HSPICE) to obtain the delay information of the path at the corresponding corners, and extract a path delay result for use in model training and inference in subsequent steps.

In step S2, it is assumed that a voltage of delay data of the input is 0.9 V, 1.0 V, and 1.1 V. A quantity of paths is 10000. A quantity of classes of temperature in circuit simulation is a total of 5 temperature points −25° C., 0° C., 25° C., 75° C., and 125° C. A sample dimension of the input may be represented as (10000, 15). Next, a dimension of an input layer (Input Layer) is changed to (10000, 15, 1) to satisfy an input format requirement of a convolutional neural network. 1 in the dimension of the input layer represents that the process used in current input circuits is TT. Subsequently, the input layer with the dimension changed is connected to 8 serially connected convolutional layers (Conv Layer). For each convolutional layer, a quantity of filters in each convolutional layer is set to 128, and at the same time is also the last dimension of the output layer of the convolutional layer. A convolution kernel has a size of 4 and a stride of 1. A dilation coefficient of the $n^{th}$ convolutional layer is 32.

Subsequently, an output of a convolutional layer is connected to a flatten layer (Flatten Layer) and is used as an input. The second dimension and the third dimension of a tensor outputted by the convolutional layer are flattened and combined to implement dimension reduction of data. After dimension conversion through a plurality of fully connected layers (Dense Layer), the data is inputted into an output layer (Output Layer). A quantity of neurons in each hidden layer is 256. Finally, an output feature of the output layer is a final feature extracted by a dilated convolutional neural network. A quantity of features is set to 128. A final delay feature obtained through extraction is combined with an output feature in step S3 for use as the input of the multi-gate mixture-of-experts network (MMoE) in step S4.

In step S3, the topological features of the path include the cell type, the cell size, and the corresponding load capacitance sequence. For two category-type sequence features of the cell type and the cell size, the problem of inconsistent sequence lengths of the two sequence features is first resolved through padding, then padded sequences are inputted into an embedding layer, a vector representation of an element is obtained through network learning, load capacitances are binned and filled by using a padding operation to a uniform length, and vector expressions are learned by using the embedding layer, next, vector splicing is performed on the foregoing expressions obtained after the learning using the embedding layer, and finally spliced vectors are inputted into the bi-directional long short-term memory neural network (BLSTM) to perform training.

For two sequences formed by category variables including a cell type sequence and a cell size sequence, preprocessing measures are similar. A conversion from a character string into an integer number is performed on the sequence first. Subsequently, an integer value vector of the path is padded or truncated to a uniform length. A padding operation is used in this section, and a padding value is 0. A length of the sequence after padding is 40, that is, a quantity of levels of the longest path in the circuit requiring prediction.

For a consecutive numerical value sequence formed by load capacitances, consecutive numerical values are first binned into different identifiers by using a binning method, and then each bin is mapped into an integral number. A binning formula bin is as follows:

$$\text{bin}(x) = \text{round}(u*x)\%v + 1 \qquad (2),$$

where the function round denotes a rounding function, x is an element in the load capacitance sequence, u denotes an amplification factor of the element, that is, a quantity of digits kept after the decimal point, a numerical value is an integer multiple of 10, and v is a quantity of bins. A strategy of the binning may map the load capacitances into 1 to v. It may be seen that after the mapping, a relative size relationship of data is still kept between the load capacitances.

Subsequently, a topological feature of the path is extracted by using the bi-directional long short-term memory neural network BLSTM, and data is first processed into an input form required for a network, and is then inputted into the network to perform training: first, after the inputted data is processed by the embedding layer, a dimension of the data is 10000×40×128. 10000 is a quantity of samples, that is, a quantity of input paths. 40 is an input length of a padded sequence, that is, a quantity of levels of a path, and is uniformly padded to a uniform length, that is, a quantity of levels of the longest input path. 128 denotes a quantity of neurons in the embedding layer, that is, a vector dimension when the element in the sequence is represented as a vector. Subsequently, an output of the embedding layer is used as the input of the bi-directional long short-term memory neural network BLSTM. Because the bi-directional long short-term memory neural network BLSTM performs bi-directional learning on the sequence, the value of hid is equal to twice a quantity of neurons in a hidden layer, that is, 256. Finally, a pooling layer is connected after the bi-directional LSTM. Dimension reduction is performed on the second dimension outputted by the sequence. A dimension of an outputted vector is 10000×128. A vector output after the dimension reduction by the pooling layer is combined with an output in step S2 for use as the input of the multi-gate mixture-of-experts network (MMoE) in S4.

In step S4, an expert layer in the multi-gate mixture-of-experts network (MMoE) can perform learning on different tasks respectively. After network learning, a gate function can assign different weights to different experts. A quantity K of tasks is 5. The task is respectively path delay prediction tasks at a voltage of 0.5 V and a total of 5 temperature points −25° C., 0° C., 25° C., 75° C., and 125° C. An output $y_k$ of a $k^{th}$ subtask is determined by the following Formula (3), where x is the input of the multi-gate mixture-of-experts network (MMoE), a dimension of the input is (10000, 256). $h^k$ is a top tower function, $f^k$ is a shared bottom operation function, $g^k$ represents the gate function, $W_{gk}$ is a learnable parameter of a weight matrix in the model, and a dimension of the weight matrix is (8, 256). 8 is a quantity of expert networks, and 256 represents a dimension of input features. That is, step S2 and step S3 output a quantity of features after feature combination. The function softmax is a normalization exponential function.

$$\begin{cases} y_k = h^k(f^k(x)) & k = 1, 2, \ldots, K \\ f^k(x) = \sum_{i=1}^{n} g^k(x)_i f_i(x) \\ g^k(x) = \text{softmax}(W_{gk}x) \end{cases} \qquad (3)$$

In the network structure of the multi-gate mixture-of-experts network (MMoE), the input features are a topological feature of the path extracted by the bi-directional long short-term memory neural network (BLSTM) and the delay feature of the path at adjacent combinations of corners. First, 8 expert layers perform learning on the input features respectively. Model parameters of these expert layers are not shared with each other. A quantity of neurons in an expert layer and a quantity of neurons in a tower layer are both 256. Subsequently, 5 gate functions adjust a weight of each expert according to a loss function of actual labels and predicted values at 5 temperatures. A final output is obtained by performing weighted summation on outputs of the 8 expert layers. A dimension of the output is (10000, 5), that is, delay prediction results of 10000 paths at a voltage of 0.5 V and a total of 5 temperature points −25° C., 0° C., 25° C., 75° C., and 125° C.

What is claimed is:

1. A method for predicting a delay at multiple corners for a digital integrated circuit, wherein the multiple corners are combinations of operating conditions comprising process, voltage, and temperature used to perform timing analysis and verification on a circuit, and the method comprises the following steps:

S1: acquiring a timing report of a specified circuit by using a timing analysis tool, extracting topology information comprising a cell type, a cell size, and a corresponding load capacitance sequence of a path from the timing report, converting the path into a transistor-level netlist, changing parameters comprising process, voltage, and temperature in the netlist, and performing simulation by using a transistor-level simulation tool to obtain delay information of the path at corresponding corners;

S2: using the delay information of the path at the corners obtained by performing simulation by using the transistor-level simulation tool (HSPICE) in step S1 as an input of a dilated convolutional neural network (Dilated CNN) model, wherein after training, the neural network can associate delays at adjacent combinations of temperature and voltage with each other and learn a relationship between the delays, to obtain a more effective expression of a delay feature of the path;

S3: using the topology information of the path comprising the cell type, the cell size, and the corresponding load capacitance sequence extracted in step S1 as an input of a bi-directional long short-term memory neural network (BLSTM), wherein after training, the neural network can model the topology information of the path, to establish a correlation between a topological structure and a path delay of the path; and S4: combining an output of the dilated convolutional neural network (Dilated CNN) model in step S2 and an output of the bi-directional long short-term memory neural network (BLSTM) in step S3 as an input of a multi-gate mixture-of-experts network (MMoE), wherein after training, the model can establish relationships between delay information and topology information of the path at a high voltage and path delays of a plurality of temperature points at a low voltage, to implement simultaneous prediction of the path delays of the plurality of temperature points at the low voltage.

2. The method for predicting a delay at multiple corners for a digital integrated circuit according to claim 1, wherein step S1 specifically comprises the following steps:

S11: performing timing analysis on the circuit by using the timing analysis tool to obtain the timing report, wherein the timing report comprises information of some paths in the circuit, and the information comprises a delay of each path and a cell type, a cell size, and a corresponding load capacitance of a cell at each level in the path; and subsequently extracting a structure of the path, and extracting topology information in each path, wherein the topology information comprises the cell type, the cell size, and the corresponding load capacitance sequence; and S22: converting the path into the transistor-level netlist by using the timing analysis tool, finally performing simulation by using the transistor-level simulation tool to obtain the delay information of the path, changing the parameters comprising process, voltage, and temperature in the netlist, performing simulation by using the transistor-level simulation tool (HSPICE) to obtain the delay information of the path at the corresponding corners, and extracting a path delay result for use in model training and inference in subsequent steps.

3. The method for predicting a delay at multiple corners for a digital integrated circuit according to claim 1, wherein in step S2, it is assumed that a voltage of delay data of the input is $V_i$, a quantity of samples is $N_s$, and a quantity of classes of temperature in circuit simulation is $N_f$, a sample dimension of the input may be represented as $(N_s, N_f)$; next, a dimension of an input layer (Input Layer) is changed to $(N_s, N_f, 1)$ to satisfy an input format requirement of a convolutional neural network, and 1 in the dimension of the input layer represents that the same process is used in current input circuits; subsequently, the input layer with the dimension converted is connected to N serially connected convolutional layers (Conv Layer), wherein N>=2; and for an $n^{th}$ convolutional layer, $F_n$ denotes a quantity of filters in the $n^{th}$ convolutional layer, that is, the last dimension outputted by the $n^{th}$ convolutional layer, $K_n$ and $S_n$ respectively denote a size and a stride of a convolution kernel in the $n^{th}$ convolutional layer, $D_n$ is a dilation coefficient of the $n^{th}$ convolutional layer, and a calculation formula of $H_n$ in the dimension outputted by the $n^{th}$ convolutional layer is as follows:

$$\begin{cases} H_1 = N_f - D_1 \\ H_n = H_{n-1} - D_n \quad n \geq 2 \end{cases} \quad (1)$$

subsequently, an output of a convolutional layer is connected to a flatten layer (Flatten Layer) and is used as an input, and the second dimension and the third dimension of a tensor outputted by the convolutional layer are flattened and combined to implement dimension reduction of data; after dimension conversion through a plurality of fully connected layers (Dense Layer), the data is inputted into an output layer (Output Layer), wherein a quantity of neurons in an $m^{th}$ fully connected layer (Dense Layer) is $Q_m$; and finally, an output feature of the output layer is a final feature extracted by a dilated convolutional neural network, a quantity of features is defined as $Q_o$, a final delay feature obtained through extraction is combined with an output feature in step S3 for use as the input of the multi-gate mixture-of-experts network (MMoE) in step S4.

4. The method for predicting a delay at multiple corners for a digital integrated circuit according to claim 1, wherein in step S3, the topology information of the path comprises the cell type, the cell size, and the corresponding load capacitance sequence, for two category-type sequence features of the cell type and the cell size, the problem of inconsistent sequence lengths of the two sequence features is first resolved through padding, then padded sequences are inputted into an embedding layer, a vector representation of an element is obtained through network learning, load capacitances are binned and filled by using a padding operation to a uniform length, and vector expressions are learned by using the embedding layer, next, vector splicing is performed on the foregoing expressions obtained after the learning using the embedding layer, and finally spliced vectors are inputted into the bi-directional long short-term memory neural network (BLSTM) to perform training.

5. The method for predicting a delay at multiple corners for a digital integrated circuit according to claim 4, wherein for the two category-type sequences of the cell type and the cell size, a similar preprocessing measure is used for a sequence formed by variables of the two categories; a mapping from a character string into an integer number is performed on the sequence first, subsequently, an integer value vector of the path is padded to a uniform length, and a padding value is 0; and for a consecutive numerical value sequence formed by load capacitances, consecutive numerical values are first binned into different identifiers by using a binning method, and then each bin is mapped into an integral number, wherein a binning formula bin is as follows:

$$\text{bin}(x) = \text{round}(u*x)\%v + 1 \quad (2),$$

wherein the function round denotes a rounding function, x is an element in the load capacitance sequence, u denotes an amplification factor of the element, that is, a quantity of digits kept after the decimal point, a numerical value is an integer multiple of 10, and v is a quantity of bins; and a strategy of the binning maps the load capacitances into 1 to v, and after the mapping, a relative size relationship of data is still kept between the load capacitances; and subsequently, a topological feature of the path is extracted by using the bi-directional long short-term memory neural network (BLSTM), and data is first processed into an input form required for a network, and is then inputted into the network to perform training: first, after the inputted data is processed by the embedding layer, a dimension of the data is $N_s \times sl \times emb$, wherein $N_s$ is a quantity of samples, that is, a quantity of input paths; sl is an input length of a padded sequence, and is uniformly padded to the same length, that is, a quantity of levels of the longest input path, and emb denotes a quantity of neurons in the embedding layer, that is, a vector dimension when the element in the sequence is represented as a vector; subsequently, an output of the embedding layer is used as the input of the bi-directional long short-term memory neural network (BLSTM), because the bi-directional long short-term memory neural network (BLSTM) performs bi-directional learning on the sequence, the value of hid is equal to twice a quantity of neurons in a hidden layer; finally, a pooling layer is connected after the bi-directional long short-term memory neural network (BLSTM), dimension reduction is performed on the second dimension outputted by the sequence, a dimension of an outputted vector is $N_s \times h_o$; and a vector output after the dimension reduction by the pooling layer is combined with an output in step S2 for use as the input of the multi-gate mixture-of-experts network (MMoE) in S4.

6. The method for predicting a delay at multiple corners for a digital integrated circuit according to claim 1, wherein for the multi-gate mixture-of-experts network (MMoE) in step S4, an expert layer can perform learning on different tasks respectively, and after network learning, a gate function can assign different weights to different experts; and it is assumed that a quantity of tasks is K, and an output $y_k$ of a $k^{th}$ subtask is determined by the following Formula (3), wherein x is the input of the multi-gate mixture-of-experts network (MMoE), $h^k$ is a top tower function, $f^k$ is a shared bottom operation function, $g^k$ represents the gate function, $W_{gk}$ is a learnable parameter of a weight matrix in the model, and a dimension of the weight matrix is (n, d), wherein n and d are respectively a quantity of expert networks and a dimension of input features, that is, a quantity of features, and the function softmax is a normalization exponential function:

$$\begin{cases} y_k = h^k(f^k(x)) & k = 1, 2, ..., K \\ f^k(x) = \sum_{i=1}^{n} g^k(x)_i f_i(x) \\ g^k(x) = \text{softmax}(W_{gk}x) \end{cases} \quad (3)$$

7. The method for predicting a delay at multiple corners for a digital integrated circuit according to claim 6, wherein the multi-gate mixture-of-experts network (MMoE), in a network structure of the model, the input features are a topological feature of the path extracted by the bi-directional long short-term memory neural network (BLSTM) and the delay feature of the path at adjacent combinations of process, voltage, and temperature, first, exp expert layers perform learning on the input features respectively, model parameters of these expert layers are not shared with each other, wherein a quantity of neurons in an expert layer and a quantity of neurons in a tower layer are denoted as $h_e$ and $h_t$ respectively; subsequently, t gate functions adjust a weight of each expert according to a loss function of actual labels and predicted labels at t temperatures, and a final output is obtained by performing weighted summation on outputs of all the expert layers, that is, is delay prediction value results of the path at t temperature points at a voltage.

* * * * *